(12) United States Patent
Obrecht et al.

(10) Patent No.: US 6,399,706 B1
(45) Date of Patent: Jun. 4, 2002

(54) MICROGEL-CONTAINING RUBBER COMPOUNDS WHICH COMPRISE SULFUR-CONTAINING ORGANOSILICON COMPOUNDS

(75) Inventors: Werner Obrecht, Moers; Winfried Jeske, Burscheid, both of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/597,045

(22) Filed: Jun. 20, 2000

(30) Foreign Application Priority Data

Jun. 26, 1999 (DE) .......................................... 199 29 347

(51) Int. Cl.[7] .......................... C08K 5/548; C08L 19/00; C08L 21/00
(52) U.S. Cl. .................. 525/191; 525/192; 525/194; 525/195; 525/208; 525/213; 525/221; 525/232; 525/233; 525/235; 525/236; 525/237; 525/238; 525/240; 525/241
(58) Field of Search ................. 525/191, 192, 525/194, 195, 208, 213, 221, 232, 233, 235, 236, 237, 238, 240, 241

(56) References Cited

U.S. PATENT DOCUMENTS

| | | | |
|---|---|---|---|
| 2,187,146 A | 1/1940 | Calcott et al. | |
| 3,842,111 A | 10/1974 | Meyer-Simon et al. | |
| 3,873,489 A | 3/1975 | Thurn et al. | |
| 3,978,103 A | 8/1976 | Meyer-Simon et al. | |
| 4,709,065 A | 11/1987 | Yoshioka et al. | 556/428 |
| 4,753,976 A * | 6/1988 | Yoshioka et al. | 524/575.5 |
| 5,110,969 A | 5/1992 | Dittrich et al. | 556/427 |
| 5,124,408 A | 6/1992 | Engels et al. | 525/215 |
| 5,227,425 A | 7/1993 | Rauline | 524/493 |
| 5,717,038 A | 2/1998 | Horpel et al. | 525/332.4 |
| 6,127,488 A | 10/2000 | Obrecht et al. | 525/333.3 |

FOREIGN PATENT DOCUMENTS

| | | |
|---|---|---|
| CA | 2226804 | 7/1997 |
| CA | 2279167 | 2/2000 |
| DE | 197 01 487 | 7/1998 |
| EP | 0 432 405 | 6/1991 |
| GB | 1078400 | 8/1967 |

* cited by examiner

*Primary Examiner*—Nathan M. Nutter
(74) *Attorney, Agent, or Firm*—Joseph C. Gil; Noland J. Cheung

(57) ABSTRACT

The present invention relates to rubber compounds comprising at least one rubber which contains double bonds, at least one rubber gel, and at least one sulfur-containing organosilicon compound. Vulcanized materials which can be employed in particular for the production of tire treads can be produced from the rubber compounds according to the invention.

6 Claims, No Drawings

MICROGEL-CONTAINING RUBBER COMPOUNDS WHICH COMPRISE SULFUR-CONTAINING ORGANOSILICON COMPOUNDS

FIELD OF THE INVENTION

This invention relates to the addition of sulfur-containing organosilicon compounds to microgel-containing rubber compounds and to vulcanized materials which are produced therefrom. The addition of sulfur-containing organosilicon compounds to microgel-containing rubber compounds results in an improvement in mechanical properties and in an improvement of the relationship between the rolling resistance and the resistance to wet slip of tread compounds.

BACKGROUND OF THE INVENTION

The production and use of sulfur-containing organosilicon compounds is described in following patents and patent applications, amongst others: DE 2,141,159, U.S. Pat. No. 3,873,489, U.S. Pat. No. 5,110,969, U.S. Pat. No. 4,709,065 and U.S. Pat. No. 5,227,425, which demonstrate the positive effect of sulfur-containing organosilicon compounds on the mechanical properties of silica-filled vulcanized materials. These publications, however, do not teach the use of sulfur-containing organosilicon compounds for improving the level of mechanical properties of microgel-containing rubber compounds without impairing the hysteresis properties thereof.

The use of microgels in rubber compounds is described in the following patent applications or patents: EP 405 216, DE 4,220,563, GB 1,078,400 and DE 19 701 489. In EP 405,216, DE 4,220,563, and in GB 1,078,400, the use is claimed of CR, BR and NBR microgels for compounds comprising rubbers which contain double bonds and for the production of the corresponding vulcanized materials. These vulcanized materials are particularly suitable for the production of tire treads, since at 70° C. they exhibit a high rebound resilience and thus, exhibit a low rolling resistance, and at 23° C. they exhibit low rebound resilience and thus, exhibit a high resistance to wet slip. In particular, the difference between the rebound resiliences at 70° C. and 23° C. is characteristic of microgel-containing vulcanized materials. However, the mechanical properties of microgel-containing vulcanized materials are not satisfactory for commercial use in tire treads. In particular, deficiencies exist in the level of mechanical properties of these vulcanized materials. There is a need here to improve the product of the tensile stress at 300 % strain and the elongation at break, as well as the abrasion-resistance.

SUMMARY OF THE INVENTION

Therefore, the object of the present invention was to improve the level of mechanical properties (tensile stress/300%×elongation at break) as well as the abrasion-resistance of microgel-containing vulcanized rubber materials, without adversely affecting the difference between the rebound resiliences at 70° C. and 23° C.

It has now been found that the level of mechanical properties (tensile stress/300%×elongation at break) of microgel-containing vulcanized rubber materials can be improved, without adversely affecting the difference between the rebound resiliences at 70° C and 23° C., by the addition of sulfur-containing organosilicon compounds to microgel-containing rubber compounds.

DETAILED DESCRIPTION OF THE INVENTION

Therefore, the present invention relates to rubber compounds which comprise at least one rubber (A) which contains double bonds, at least one rubber gel (B), and at least one sulfur-containing organosilicon compound (C), wherein the proportion of rubber (A) which contains double bonds is 100 parts by weight, the proportion of rubber gel (B) is 1 to 150 parts by weight and the proportion of sulfur-containing organosilicon compound (C) is 0.2 to 20 parts by weight, preferably 1 to 10 parts by weight and which also, optionally, comprise rubber adjuvant substances and optionally comprise other fillers.

A rubber (A) which contains double bonds is to be understood to comprise rubbers which have practically no gel content and which are denoted as R rubbers according to DIN/ISO 1629. These rubbers have a double bond in their main chain. Examples thereof include:
NR: natural rubber
SBR: styrene/butadiene rubber
BR: polybutadiene rubber
NBR: nitrile rubber
IIR: butyl rubber
HNBR: hydrogenated nitrile rubber
SNBR: styrene/butadiene/acrylonitrile rubber
CR: polychloroprene
XSBR: carboxylated styrene/butadiene rubber
XNBR: carboxylated butadiene/acrylonitrile rubber
ENR: epoxidized natural rubber.
ESBR: epoxidized styrene/butadiene rubber.

Rubbers which contain double bonds are also to be understood, however, as rubbers which are M rubbers according to DIN/ISO 1629 and which apart from their saturated main chain contain double bonds in side chains. These rubbers include EPDM for example.
NR, BR, SBR, IIR and EPDM are preferred.

Rubber gels (B) are to be understood as rubber particles (microgels) which are obtained by crosslinking the following rubbers:
BR: polybutadiene,
ABR: copolymers of butadiene/acrylic acid $C_{1-4}$ alkyl esters,
IR: polyisoprene,
SBR: styrene-butadiene copolymers with styrene contents of 1–60, preferably 2–50 percent by weight,
X-SBR: carboxylated styrene-butadiene copolymers
FKM: fluorinated rubber,
ACM: acrylate rubber,
NBR: polybutadiene-acrylonitrile copolymers with acrylonitrile contents of 5–60, preferably 10–50 percent by weight,
X-NB R: carboxylated nitrile rubbers,
CR: polychloroprene,
IIR: isobutylene/isoprene copolymers with isoprene contents of 0.5–10 percent by weight,
BIIR: brominated isobutylene/isoprene copolymers with bromine contents of 0.1–10 percent by weight,
CIIR: chlorinated isobutylene/isoprene copolymers with chlorine contents of 0.1–10 percent by weight,
HNBR: partially and completely hydrogenated nitrile rubbers,
EPDM: ethylene-propylene-diene copolymers,
EAM: ethylene/acrylate copolymers
EVM: ethylene/vinyl acetate copolymers,
ECO: epichlorohydrin rubbers,
Q: silicone rubbers,
AU: polyester urethane polymers,
EU: polyether urethane polymers,
ENR: epoxidized natural rubber or mixtures thereof.
Gels based on NR, BR, SBR, CR and NBR are preferred.

Rubber gels (B) can also, of course, contain hydroxyl and/or carboxyl groups. Rubber gels, which contain hydroxyl groups, are preferably used in the rubber compounds according to the present invention.

The microgels have particle diameters of 5–1000 nm, preferably 20–600 nm (DVN value according to DIN 53206). Because they are crosslinked, they are insoluble, and can be swollen in suitable swelling agents such as toluene. The swelling indices of the microgels (Q) in toluene range from 1–15, preferably from 1–10. The swelling index is calculated from the weight of the solvent-containing gel (after centrifugation at 20,000 rpm) and the weight of the dry gel: $Q_i$=moist weight of gel/dry weight of gel.

To determine the swelling index, 250 mg gel are allowed to swell in 25 ml toluene for 24 hours with shaking. The gel is centrifuged off and weighed, and is subsequently dried to constant weight at 70° C. and weighed again.

The uncrosslinked rubber starting materials can be produced in the known manner by emulsion polymerization or by solution polymerization.

Naturally occurring latices such as natural rubber latex can also be used.

The following monomers, which can be polymerized by a radical mechanism, are used for the production of microgels by emulsion polymerization: butadiene, styrene, acrylonitrile, isoprene, esters of acrylic and methacrylic acid, tetrafluoroethylene, vinylidene fluoride, hexafluoropropene, 2-chlorobutadiene and 2,3-dichlorobutadiene, as well as carboxylic acids which contain double bonds, such as acrylic acid, methacrylic acid, maleic acid and itaconic acid for example, hydroxy compounds which contain double bonds, such as hydroxyethyl methacrylate, hydroxyethyl acrylate and hydroxybutyl methacrylate, or epoxides which contain double bonds, such as glycidyl methacrylate or glycidyl acrylate for example. Crosslinking of the rubber gels can be effected directly during emulsion polymerization, by copolymerization with multi-functional compounds which have a crosslinking effect. The preferred multi-functional comonomers are compounds which comprise least two, preferably 2 to 4 copolymerizable C=C double bonds, such as diisopropenylbenzene, divinylbenzene, divinyl ether, divinylsulfone, diallyl phthalate, triallyl cyanurate, triallyl isocyanurate, 1,2-polybutadiene, N,N'-m-phenylenemaleimide, 2,4-bis(maleimido)toluene and/or triallyl trimellitate. Other suitable comonomers are the acrylates and methacrylates of polyhydric, preferably di- to tetrahydric $C_2$ to $C_{10}$ alcohols, such as ethylene glycol, 1,2-propanediol, butanediol, hexanediol, polyethylene glycols comprising 2 to 20, preferably 2 to 8 oxyethylene units, neopentyl glycol, bisphenol A, glycerol, trimethylpropane, pentaerythritol, or sorbitol with unsaturated polyesters of aliphatic di- and polyols, and also include maleic acid, fumaric acid and/or itaconic acid.

Crosslinking to form rubber gels during emulsion polymerization can also be effected by continuing the polymerization to achieve high conversions, or in a process involving the addition of monomer can be effected by polymerization with high internal conversions. Another possibility is to conduct emulsion polymerization in the absence of regulators.

For the production of strongly- or weakly-crosslinked polymers following emulsion polymerization, it is best to use the latices which are obtained during the emulsion polymerization. Natural rubber latices can also be crosslinked in this manner. The method can also be applied to polymer dispersions which can be obtained by deposition from organic solutions. In principle, this method can also be applied to non-aqueous polymer dispersions.

Examples of suitable chemicals which exert a crosslinking action include organic peroxides such as dicumyl peroxide, t-butyl cumyl peroxide, bis-(t-butyl-peroxy-isopropyl)benzene, di-t-butyl peroxide, 2,5-dimethylhexane 2,5-dihydroperoxide, 2,5-dimethylhexyne 3,2,5-dihydroperoxide, dibenzoyl peroxide, bis-(2,4-dichlorobenzoyl) peroxide and t-butyl perbenzoate, as well as organic azo compounds such as azo-bis-isobutyronitrile and azo-bis-cyclohexane nitrile, and also include di- and polymercapto compounds, such as dimercaptoethane, 1,6-dimercaptohexane 1,3,5-trimercapto-triazine, and mercapto-terminated polysulfide rubbers such as the mercapto-terminated reaction products of bis-chloroethylformal with sodium polysulfide. The optimum temperature for conducting the crosslinking reaction depends, of course, on the reactivity of the crosslinking agent, and can range from room temperature to about 180° C., with the reaction optionally being conducted under elevated pressure (in this connection, see Houben-Weyl, Methoden der organischen Chemie, 4th Edition, Volume 14/2, page 848). Peroxides are particularly preferred as crosslinking agents.

The crosslinking of rubbers which contain C=C double bonds to form microgels can also be effected in a dispersion or emulsion, with the simultaneous partial or optionally complete hydrogenation of the C=C double bond by hydrazine as described in U.S. Pat. No. 5,302,696 or U.S. Pat. No. 5,442,009, or by other hydrogenating agents, for example organometallic hydride complexes.

Rubbers which are produced by solution polymerization can also be employed as starting materials for the production of microgels. The actual starting materials here are solutions of these rubbers in suitable organic solutions. The desired size of the microgels is produced by mixing the rubber solution within a liquid medium, preferably in water, optionally with the addition of suitable surface-active adjuvant substances, such as surfactants for example, by means of suitable processing units, so that a dispersion of the rubber is obtained which has a suitable particle size range. The procedure for crosslinking the dispersed solution rubber is as described previously for the subsequent crosslinking of emulsion polymers. The aforementioned compounds are suitable crosslinking agents, and the solvent which is used for the production of the dispersion can optionally be removed, e.g. by distillation, before crosslinking is effected.

Sulfur-containing organosilicon compounds (C) have the following basic structures:

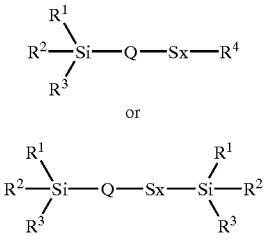

wherein
$R^1$, $R^2$ and $R^3$ represent alkoxy groups comprising 1 to 20 C atoms,
X represents integers from 2 to 8,
Q is a spacer group comprising structural elements based on aliphatic, heteroaliphatic, aromatic and heteroaromatic hydrocarbon chains comprising 1 to 20 C atoms and 1 to 3 hetero atoms, such as N, S or O, and
$R^4$ represents a group which occurs, in particular, in what are termed vulcanization accelerators, for example:

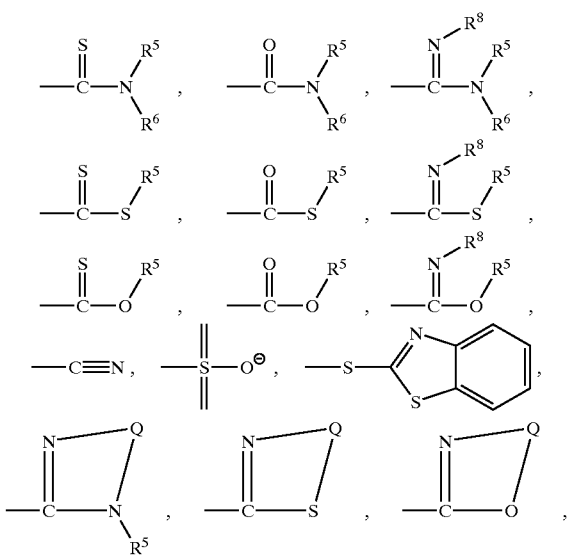

wherein $R^5$, $R^6$ and $R^8$ represent a $C_1$–$C_{10}$ aryl and a $C_6$–$C_{10}$ arly and a $C_7$–$C_{12}$ aralky, and Q has the above meaning.

The preferred sulfur-containing organsilicon compound is bis(tri-ethoxy-silylpropyl-disulfane), which is represented by the formoula below. A product of this type is commercially available as Si 69 from Degussa.

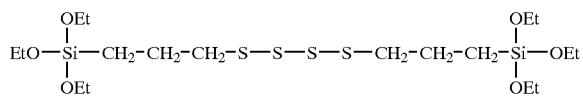

The rubber compounds according to the present invention, which comprise a rubber (A) which contains double bonds, a rubber gel (B), and a sulfur-containing organosilicon compound (C), can additionally contain other components such as fillers.

Fillers which are particularly suitable for the production of the rubber compounds and vulcanized rubber materials according to the present invention are:

Carbon blacks. The carbon blacks used here are produced by the flame black, furnace black or gas black processes, and have BET specific surfaces of 20–200 $m^2$/g, e.g. SAF, ISAF, IISAF, HAF, FEF or GPF carbon blacks;

Microdispersed hydrated silicas, produced, for example, by precipitation from solutions of silicates or by the flame hydrolysis of silicon halides, which have specific surfaces of 5–1000, preferably 20–400 $m^2$/g (BET specific surface) and primary particle sizes of 5–400 nm. These hydrated silicas can also exist as mixed oxides with other metal oxides, such as Al, Mg, Ca, Ba, Zn and Ti oxides;

Synthetic silicates such as aluminum silicate or alkaline earth silicates such as magnesium silicate or calcium silicate, with BET specific surfaces of 20–400 $m^2$/g and primary particle diameters of 5–400 mn;

Natural silicates such as kaolin, and other naturally occurring hydrated silicas;

Metal oxides such as zinc oxide, calcium oxide, magnesium oxide, aluminum oxide;

Metal carbonates such as calcium carbonate, magnesium carbonate, zinc carbonate;

Metal sulfates such as calcium sulfate, barium sulfate;

Metal hydroxides such as aluminum hydroxide and magnesium hydroxide;

Glass fibers and glass fiber products (laths, strands or glass microspheres);

Thermoplastic fibers (polyamide, polyester, aramid);

Rubber gels based on CR, BR, SBR and also all the other gel particles described above which have a high degree of crosslinking and which have particle sizes from 5–1000 nm.

The aforementioned fillers can be used on their own or in admixture. In one particularly preferred embodiment of the method, 10–100 parts by weight rubber gel (B) are used, optionally together with 0.1–100 parts by weight carbon black and/or 0.1–100 parts by weight of light fillers, with respect to 100 parts by weight of uncrosslinked rubber in each case.

Furthermore, the rubber compounds according to the present invention can also contain customary rubber adjuvant substances, such as crosslinking agents, reaction accelerators, anti-aging agents, thermal stabilizers, light stabilizers, ozone stabilizers, processing aids, plasticizers, tackifiers, foaming agents, colorants, pigments, wax, extenders, organic acids, retarders and metal oxides, as well as filler activators such as triethanolamine, polyethylene glycol, hexanetriol or other substances which are known in the rubber industry.

These rubber adjuvant substances are used in the customary amounts which depend, amongst other factors, on the purpose of use. Amounts from 0.1–50 percent by weight, with respect to the amounts of rubber (A) used, are examples of customary amounts.

Sulfur, sulfur donors, peroxides or crosslinking agents such as dilsopropenylbenzene, divinylbenzene, divinyl ether, divinylsulfone, diallyl phthalate, triallyl cyanurate, triallyl isocyanurate, 1,2-polybutadiene, N,N'-m-phenylenemaleimide and/or triallyl trimellitate can be used as customary crosslinking agents. Other suitable crosslinking agents include the acrylates and methacrylate of polyhydric alcohols, preferably di- to tetrahydric $C_2$ to $C_{10}$ alcohols, such as ethylene glycol, 1,2-propanediol, butanediol, hexanediol, polyethylene glycols comprising 2 to 20, preferably 2 to 8 oxyethylene units, neopentyl glycol, bisphenol A, glycerol, trimethylpropane, pentaerythritol, sorbitol with unsaturated polyesters of aliphatic di- and polyols, and also maleic acid, fumaric acid and/or itaconic acid.

The rubber compounds according to the present invention can also contain vulcanization accelerators. Example of suitable vulcanization accelerators include mercaptobenzthiazoles, mercaptosulfenamides, guanidine, thiurams, dithiocarbamates, thioureas and thiocarbonates, as well as dithiophosphates. The vulcanization accelerators, sulfur and sulfur donors or peroxides or other crosslinking agents such as dimeric toluene 2,4-diisocyanate (=Desmodur® TT) or 1,4-bis-1-ethoxyhydroquinone (=crosslinking agent 30/10) are used in amounts of 0.1–40 percent by weight, preferably 0.1–10 percent by weight, with respect to the total amount of rubber. Vulcanization of the rubber compounds according to the present invention can be effected at temperatures from 100–250° C., preferably 130–180° C., optionally, under a pressure of 10–200 bar.

The compounds according to the present invention, which comprise unsaturated rubber (A), rubber gel (B) and sulfur-containing organosilicon compound (C), can be produced in various ways:

First, it is, of course, possible to mix the individual solid components. Examples of processing units which are suitable for this purpose include rolls, kneaders or mixer extruders. It is also possible, however, to effect mixing by combining the latices of the uncrosslinked rubbers or even of the crosslinked rubbers. The compound, according to the present invention, which is thus produced can be isolated in a customary manner, by evaporation, precipitation or freeze-coagulation (see U.S. Pat. No. 2,187,146). By mixing fillers into the latex mixture, followed by work-up, the compounds according to the present invention can be obtained directly as a rubber/filler formulation. The addition of further compound constituents, such as additional fillers and optionally rubber adjuvant substances, to the compound comprising rubber (A) which contains double bonds, rubber gel (B) and sulfur-containing organosilicon compound (C), is effected in customary mixer units, on rolls, in kneaders or in mixer extruders. The preferred mixing temperatures range from 50–180° C.

Corresponding vulcanized materials can be produced by vulcanization from the rubber compounds according to the present invention, and are suitable for the production of cable sheathing, hoses, drive belts, conveyor belts, roll claddings, tires, particularly tire treads, shoe soles, sealing rings and damping elements, as well as diaphragms. They are particularly preferred for the production of tire treads.

The invention is further illustrated but is not intended to be limited by the following examples in which all parts and percentages are by weight unless otherwise specified.

EXAMPLES

The effect according to the invention was demonstrated by the compounds which contained the gels listed below:
an SBR microgel containing 22% by weight styrene [gel (1)]
an SBR microgel modified with hydroxyl groups and containing 22% by weight styrene [gel (2)]
an SBR microgel modified with hydroxyl groups and containing 39% by weight styrene [gel (3)]

EXAMPLE 1

Production of Rubber Gels

SBR microgels containing 22% by weight styrene (gel 1) in an NR master batch.

The NR master batch based on gel (1) was produced from Baystal 1357 manufactured by Polymer Latex GmbH (formerly Bayer France, Port Jérôme) by crosslinking with dicumyl peroxide. The crosslinked gel, which was present as a latex, was mixed with natural rubber before the latex compound was worked up. The master batch contained 50% by weight of gel (1).

Baystal 1357 is a non-carboxylated SBR latex with a styrene content of 22% by weight and a solids content of 38% by weight. The gel content is 75% by weight and the swelling index of the gelled fraction is 61 (moist weight/dry weight in toluene). The latex particles have a diameter of $d_{10}$=50 nm, $d_{50}$=56 nm and $d_{80}$=60 nmn. The density of the latex particles is 0.9281 g/cm$^3$. The glass transition temperature of the SBR is –57° C.

For crosslinking with dicumyl peroxide (DCP), the latex was diluted to a solids concentration of 30% by weight and was introduced into an autoclave. DCP was added in solid form at room temperature (1.5 phr with respect to the solid product). The DCP was melted by heating the latex to 60° C., and was well dispersed in the latex by stirring. In order to remove oxygen, the reactor contents were evacuated at 60° C. with stirring, and nitrogen was admitted under pressure. The evacuation/$N_2$ gasification cycle was repeated 3 times. Thereafter, the reactor was heated to 150° C. In order to prevent caked latex deposits from occurring on heating, it was ensured that the difference between the shell and internal temperatures did not exceed 10° C. After heating, the internal temperature was maintained at least 150° C. for 45 minutes. Thereafter, the latex was cooled and filtered off through a Monodur cloth. The particle size of the latex was practically unaffected by the subsequent crosslinking with DCP. The gel content increased to 97.5% and the density increased to 0.9717 g/cm$^3$. The swelling index decreased to 5.4% and the glass transition temperature rose to –26.5° C.

5 kg of the SBR rubber latex which had been treated in this manner, and which had a solids content of 30% by weight, were stirred into a mixture comprising 5 kg of natural rubber latex with a solids content of 30% by weight, 300 g of a 5% aqueous solution of a resin soap (Dresinate 731, manufactured by Hercules) and 150 g of a 10 % aqueous dispersion of the anti-aging agent Vulkanox 4020 (manufactured by Bayer AG).

The latex compound, which was obtained, contained crosslinked rubber and natural rubber in a ratio by weight of 1:1.

In order to precipitate 3 kg of rubber compound, 10.45 kg of the latex compound were stirred at 65° C. into a solution of 225 g NaCl, 40.8 g $Al_2(SO_4)_3 \times 18\ H_2O$ 4.5 g gelatin in 30 liters of water, with the pH being maintained at 4 by adding 10% $H_2SO_4$. The product was thoroughly washed with water and was dried under vacuum at 70° C. for 2 days.

A master batch was obtained which consisted of 50% by weight of crosslinked SBR microgel and 50% by weight of natural rubber.

EXAMPLE 2

SBR Microgel Modified with Hydroxyl Groups and Containing 22% by Weight Styrene [gel (2)]

Gel (2) was produced as described for gel (1), except that grafting with 3 phr hydroxyethyl methacrylate (HEMA) was effected before the gel was worked up. Moreover, the gel was not worked up as a master batch.

For the grafting of the gel with hydroxymethyl methacrylate (HEMA), the Baystal latex which was crosslinked with 1.5 phr dicumyl peroxide was placed in a three-necked flask and was diluted with water so that the theoretical final solids content of the latex was 20% by weight at quantitative conversion of the HEMA. After adding 3 phr of 97% HEMA (Aldrich) with respect to the latex solids content, and adding 0.12 phr of 50% p-menthane hydroperoxide (Triganox NT 50/Akzo Chemie), the reaction mixture was heated with stirring to 70° C. and was stirred for 1 hour at this temperature. 0.05% by weight, with respect to the latex solids, of an 0.5% by weight aqueous solution of the Na salt of 1-hydroxymethanesulphinic acid dihydrate (Rongalit/BASF) was then added over 1 hour. During the entire reaction, the pH was held constant at pH=9 by adding 1 N NaOH. After a reaction time of 1 hour at 70° C., the latex exhibited a polymerization conversion of about 90%. The density of the latex particles was 0.987 g/cm$^3$.

Before the precipitation of the hydroxyl-modified latex, the following anti-aging agents were stirred into the latex, in the following amounts with respect to 100 parts by weight solids [phr]:
0.05 phr 2,2-methylene-bis-(4-methyl-6-cyclohexylphenol) (Vulkanox ZKF/Bayer AG)

0.22 phr di-t-butyl-p-cresol (BHT/Bayer AG)
0.38 phr di-lauryl thiodipropionate (PS 800 manufactured by Ciba Geigy).

The following precipitation liquor was placed in a vessel before the precipitation of 5.035 kg of a 19.86% latex:

| 6000 g | water |
|---|---|
| 795.6 g | common salt |
| 425.0 g | Superfloc C 567/1% (American Cyanamid Corporation) |

The precipitation liquor was heated to 60° C. and its pH was adjusted to 4 with 10% sulfuric acid. The latex was introduced into the precipitation liquor while maintaining this pH. After adding the latex, the mixture was heated to 60° C. and was cooled to 30° C. by adding cold water. The crumb-like rubber material was washed twice by removing the liquid phase from the vessel and adding about 10 liters of cold water with respect to the solid, with stirring.

After the second washing, the crumb-like rubber material was isolated by filtration and was dried to constant weight at 70° C. in a vacuum drying oven (about 60 hours).

The gel content of the dried polymer was 96% by weight (as determined in toluene at room temperature), and the swelling index of the gelled fraction was 5.6 (moist weight/dry weight in toluene). The OH number of the polymer was 9 mg KOH/g polymer and the glass transition temperature of the polymer was −9.5° C.

EXAMPLE 3

SBR Nicrogel Modified with Hdroxyl Goups and Containing 39% by Weight Styrene [(gel (3)]

Gel (3) was produced from the SBR latex precursor of Krylene 1721 (Bayer France, La Wantzenau). For this purpose, the latex was used after polymerization and after removal of unreacted monomers (i.e. before stabilization with anti-aging agents and before the addition of oil). The latex was crosslinked with 1.0 phr dicumyl peroxide with respect to the solid product, as described for gel (1), and was modified with hydroxyethyl methacrylate (3 phr) as described for gel (2). The crosslinked gel was isolated from the latex as described for gel (2).

The characteristic properties of the gel were as follows:

| diameter: | $d_{10}$ = 38 nm; $d_{50}$ = 51 nm; $d_{80}$ = 60 nm: |
|---|---|
| gel content in toluene: | 95% by weight; |
| swelling index in toluene: | 6.6; |
| glass transition temperature: | −23° C. |
| OH number: | 12.7 mg KOH/g polymer |

EXAMPLE 4

Compound Production, Vulcanization and Properties of Vulcanized Materials

In the 1st series of compounds, the effect according to the invention was demonstrated with Si 69 for a non-hydroxyl-modified SBR microgel (gel 1):

For this purpose, the components of the compound were mixed in a laboratory kneader in the given sequence for 4 minutes at 140° C., according to the following formulations. In this series of compounds, the gel, together with part of the natural rubber, were incorporated in the form of an NR master batch:

| Compound No.: | 1 | 2 |
|---|---|---|
| TSR 5, Defo 700* | 40 | 40 |
| Gel 1/NR master batch (50/50) | 120 | 120 |
| Atilux ® 654** | 1.5 | 1.5 |
| Stearic acid | 3 | 3 |
| Zinc oxide | 3 | 3 |
| Vulkanox ® 4010NA*** | 1 | 1 |
| Vulkanox ® HS**** | 1 | 1 |
| Si 69***** | 0 | 6 |

\* = masticated natural rubber,
\*\* = microcrystalline ozone-protective wax/Rhein Chemie,
\*\*\* = N-isopropyl-N'-phenyl-p-phenylenediamine/Bayer AG (IPPD),
\*\*\*\* = 2,2,4-trimethyl-1,2-dihydroquinoline (TMQ)/Bayer AG,
\*\*\*\*\* = bis(tri-ethoxy-silyl-propyl-disulfone)/Degussa.

After ejection from the kneader, sulfur and the accelerator were admixed on a roll which was preheated to 40° C., whereupon the temperature of the mixed material at the end of the mixing period was about 70° C.

| Compound No. | 1 | 2 |
|---|---|---|
| Sulfur | 1.6 | 1.6 |
| Vulkacit ® NZ[1)] | 1.0 | 1.0 |

[1)]=N tert-butyl-2-benzothiazylsulphenamide (TBBS)/Bayer AG

After mixing, the ML 1+4 viscosities of the compounds were determined at 100° C., and the Mooney relaxation was determined:

| Compound No.: | 1 | 2 |
|---|---|---|
| ML 1 + 4 (100° C.) [ME] | 44.8 | 47 |
| MR 30 [%] | 4.5 | 7.6 |

The rates of vulcanization of the compounds were investigated in a rheometer experiment at 160° C. Characteristic heating times, such as $t_{95}$ for example, were determined in this manner. The time $t_{95+5}$ was selected as the vulcanization time for the production of vulcanized materials:

| Compound No.: | 1 | 2 |
|---|---|---|
| Vulcanization time [min] | 16.5 | 9 |

The following test results were obtained based on the aforementioned compounds:

| Compound No.: | 1 | 2 |
|---|---|---|
| Tensile strength [MPa] | 25.4 | 26.8 |
| Elongation at break [%] | 627 | 612 |
| Tensile stress at 100% strain [MPa] | 1.5 | 2 |
| Tensile stress at 300% strain [MPa] | 6.1 | 7.9 |
| Shore A hardness, 23° C. | 58 | 60 |
| Shore A hardness, 70° C. | 51 | 56 |
| Rebound resilience, 23° C. [%] | 41 | 45 |
| Rebound resilience, 70° C. [%] | 63 | 66 |

-continued

| Compound No.: | 1 | 2 |
|---|---|---|
| Abrasion/60 DIN 53516[mm3] | 197 | 174 |
| Abrasion/60 DIN 53516[mm3] | 121 | 107 |

EXAMPLE 5

In the 2nd Series of Compounds, the Effect of Si 69 on an SBR Microgel Containing Hydroxyl Groups (gel 2) was Demonstrated For this purpose, the components of the compound were mixed in the given sequence in a laboratory kneader for 4 minutes at 140° C., according to the following formulations:

| Compound No. | 1 | 2 |
|---|---|---|
| TSR 5, Defo 700 | 100 | 100 |
| Gel 2 | 75 | 75 |
| Enerthene[2)] 1849-1 | 3 | 3 |
| Antilux ® 654 | 1.5 | 1.5 |
| Stearic acid | 3 | 3 |
| Zinc oxide | 3 | 3 |
| Vulkanox ® 4010 NA | 1 | 1 |
| Vulkanox ® HS | 1 | 1 |
| Si 69 | 0 | 6 |

After ejection from the kneader, sulfur and the accelerator were admixed on a roll which was preheated to 40° C., whereupon the temperature of the mixed material at the end of the mixing period was about 70° C.

| Compound No. | 1 | 2 |
|---|---|---|
| Sulfur | 1.6 | 1.6 |
| Vulkacit ® NZ | 1 | 1 |
| Vulkacit ® D[3)] | 2 | 2 |

[2)]=mineral oil plasticizer/BP
[3)]=diphenylguanidine (DPG)/Bayer AG

After mixing, the ML 1+4 viscosities of the compounds were determined at 100° C., and the Mooney relaxation was determined:

| Compound No.: | 1 | 2 |
|---|---|---|
| ML 1 + 4 (100° C.) [ME] | 37.7 | 54.7 |
| MR 30 [%] | 5.3 | 12.4 |

The rates of vulcanization of the compounds were investigated in a rheometer experiment at 160° C. Characteristic heating times, such as $t_{95}$ for example, were determined in this manner. $t_{95+5}$ was selected as the vulcanization time for the production of vulcanized materials:

| Compound No.: | 1 | 2 |
|---|---|---|
| Vulcanization time [min] | 11.5 | 18.4 |

The following test results were obtained based on the aforementioned compounds:

| Compound No.: | 1 | 2 |
|---|---|---|
| Tensile strength [MPa] | 21.7 | 17.9 |
| Elongation at break [%] | 619 | 416 |
| Tensile stress at 100% strain [MPa] | 1.7 | 3.8 |
| Tensile stress at 300% strain [MPa] | 6.5 | 11.3 |
| Shore A hardness, 23° C. | 59 | 68 |
| Shore A hardness, 70° C. | 52 | 62 |
| Rebound resilience, 23° C. [%] | 29 | 33 |
| Rebound resilience, 70° C. [%] | 56 | 63 |
| Abrasion/60 DIN 53516[mm3] | 213 | 213 |
| Abrasion/60 DIN 53516[mm3] | 183 | 116 |

EXAMPLE 6

In the 3rd Series of Compounds, the Effect of Si 69 on an SBR Microzel Comprising 39% by Weight Styrene and Containing Hydroxyl Groups (gel 2) was Demonstrated For this purpose, the components of the compound were mixed in the given sequence in a laboratory kneader for 4 minutes at 140° C., according to the following formulations:

| Compound No.: | 1 | 2 |
|---|---|---|
| TSR 5, Defo 700 | 100 | 100 |
| Gel 2 | 75 | 75 |
| Enerthene ® 1849-1 | 3 | 3 |
| Antilux ® 654 | 1.5 | 1.5 |
| Stearic acid | 3 | 3 |
| Zinc oxide | 3 | 3 |
| Vulkanox ® 4010 NA | 1 | 1 |
| Vulkanox ® HS | 1 | 1 |
| Si 69 | 0 | 6 |

After ejection from the kneader, sulfur and the accelerator were admixed on a roll which was preheated to 40° C., whereupon the temperature of the mixed material at the end of the mixing period was about 70° C.

| Compound No. | 1 | 2 |
|---|---|---|
| Sulfur | 1.6 | 1.6 |
| Vulkacit ® NZ | 1 | 1 |
| Vulkacit ® D | 2 | 2 |

After mixing, the ML 1+4 viscosities of the compounds were determined at 100° C., and the Mooney relaxation was determined:

| Compound No.: | 1 | 2 |
|---|---|---|
| ML 1 + 4 (100° C.) [ME] | 46.5 | 63.9 |
| MR 30 [%] | 8.6 | 16.4 |

The rates of vulcanization of the compounds were investigated in a rheometer experiment at 160° C. Characteristic heating times, such as $t_{95}$ for example, were determined in this manner. $t_{95+5}$ was selected as the vulcanization time for the production of vulcanized materials:

| Compound No.: | 1 | 2 |
|---|---|---|
| Vulcanization time t 95 + 5 [min] | 9.4 | 10.6 |

The following test results were obtained based on the aforementioned compounds:

| Compound No.: | 1 | 2 |
|---|---|---|
| Tensile strength [MPa] | 17.4 | 21.3 |
| Elongation at break [%] | 610 | 563 |
| Tensile stress at 100% strain [MPa] | 1.3 | 2.4 |
| Tensile stress at 300% strain [MPa] | 3.5 | 7.7 |
| Shore A hardness, 23° C. | 51 | 56 |
| Shore A hardness, 70° C. | 44 | 51 |
| Rebound resilience, 23° C. [%] | 20 | 23 |
| Rebound resilience, 70° C. [%] | 63 | 68 |
| Abrasion/60 DIN 53516[mm3] | 318 | 253 |
| Abrasion/60 DIN 53516[mm3] | 303 | 161 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A rubber compound which comprises:
    a) about 100 parts by weight based on said weight of said rubber compound of at least one rubber (A) which contains double bonds,
    b) from about 1 to 150 parts by weight of at least one rubber gel (B),
    c) from about 0.2 to 20 parts by weight bis(triethoxy-silyl-propyldisulphane) (C),
    d) optionally, rubber auxiliaries and crosslinking agents,
    e) and optionally comprise fillers.

2. A rubber compound according to claim 1, wherein said rubber (A) is selected from the group consisting of NR, BR, SBR, IIR, and EPDM.

3. A rubber compound according to claim 1, wherein said rubber gels (B) is selected from the group of BR, NR, NBR, CR and SBR microgels.

4. A molding comprising a rubber compound, which comprises:
    a) about 100 parts by weight based on the weight of said rubber compound of at least one rubber (A) which contains double bonds,
    b) from about 1 to 150 parts by weight of at least one rubber gel (B),
    c) from about 0.2 to 20 parts by weight of bis(triethoxy-silyl-propyldisulphane) (C),
    d) optionally, rubber auxiliaries and crosslinking agents,
    e) and optionally comprise fillers.

5. A molding according to claim 4, wherein said rubber (A) is selected from the group consisting of NR, BR, SBR, IIR and EPDM.

6. A molding according to claim 4, wherein said rubber gels (B) is selected from the group of BR, NR, NBR, CR and SBR microgels.

* * * * *